United States Patent
Schmidt et al.

(10) Patent No.: US 8,567,716 B2
(45) Date of Patent: Oct. 29, 2013

(54) LANDING GEAR UPLOCK MECHANISM EMPLOYING THERMAL PHASE-CHANGE ACTUATION

(75) Inventors: R. Kyle Schmidt, Cheltenham (GB); Michael Sinclair, Puslinch (CA); Edward Chun Kei Chan, Waterloo (CA)

(73) Assignee: Messier-Dowty Inc. (CA)

( * ) Notice: Subject to any disclaimer, the term of this patent is extended or adjusted under 35 U.S.C. 154(b) by 614 days.

(21) Appl. No.: 12/809,885

(22) PCT Filed: Dec. 19, 2008

(86) PCT No.: PCT/CA2008/002255
§ 371 (c)(1),
(2), (4) Date: Nov. 19, 2010

(87) PCT Pub. No.: WO2009/079785
PCT Pub. Date: Jul. 2, 2009

(65) Prior Publication Data
US 2011/0056197 A1 Mar. 10, 2011

Related U.S. Application Data

(60) Provisional application No. 61/016,278, filed on Dec. 21, 2007.

(51) Int. Cl.
*B64C 25/10* (2006.01)
(52) U.S. Cl.
USPC ............... 244/102 A; 244/102 R; 244/102 SL
(58) Field of Classification Search
USPC ................ 244/102 A, 102 R, 102 SL; 60/527
See application file for complete search history.

(56) References Cited

U.S. PATENT DOCUMENTS

| 5,022,609 | A | | 6/1991 | Cranston | |
|---|---|---|---|---|---|
| 5,025,627 | A | | 6/1991 | Schneider | |
| 5,288,037 | A | * | 2/1994 | Derrien | 244/102 SL |
| 5,685,149 | A | | 11/1997 | Schneider | |
| 6,192,684 | B1 | | 2/2001 | McBirney | |
| 6,811,118 | B2 | * | 11/2004 | Collet et al. | 244/102 SL |

(Continued)

FOREIGN PATENT DOCUMENTS

| GB | 1395420 A | 5/1975 |
|---|---|---|
| JP | 2008025764 A | 2/2008 |
| WO | 94/13952 A1 | 6/1994 |

OTHER PUBLICATIONS

International Search Report issued by the Canadian Intellectual Property Office mailed Mar. 18, 2009 for corresponding International Application No. PCT/CA2008/002255 filed Dec. 19, 2008, 7 pages.

(Continued)

*Primary Examiner* — Christopher P Ellis
(74) *Attorney, Agent, or Firm* — Katten Muchin Rosenman LLP (57) ABSTRACT

An uplock assembly for retaining and releasing landing gear systems, said uplock assembly comprising: a thermal actuator comprising: a chamber configured to contain expansible material therein; a heating mechanism coupled to said chamber for heating said expansible material and causing volumetric expansion thereof; a piston slidably coupled to said chamber and adapted to extend in response to said volumetric expansion; and an uplock release mechanism releasably engaged by said piston when extended such that said engaged uplock release mechanism causes the release of said landing gear.

17 Claims, 7 Drawing Sheets

(56) References Cited

U.S. PATENT DOCUMENTS

| | | | |
|---|---|---|---|
| 7,098,619 B2 | 8/2006 | Stridsberg | |
| 8,061,654 B2* | 11/2011 | Meyer et al. | 244/102 A |
| 2006/0163426 A1* | 7/2006 | Smith, III | 244/102 R |
| 2009/0250552 A1* | 10/2009 | Kearns et al. | 244/102 A |
| 2009/0283634 A1* | 11/2009 | Tran | 244/102 A |
| 2011/0278394 A1* | 11/2011 | Ditzler | 244/102 SL |
| 2012/0037752 A1* | 2/2012 | Collins | 244/102 SL |

OTHER PUBLICATIONS

Written Opinion of the International Searching Authority issued by the Canadian Intellectual Property Office mailed Mar. 18, 2009 for corresponding International Application No. PCT/CA2008/002255 filed Dec. 19, 2008, 6 pages.

International Preliminary Report on Patentability issued by the he Canadian Intellectual Property Office mailed Jul. 1, 2010 for corresponding International Application No. PCT/CA2008/002255 filed Dec. 19, 2008, 8 pages.

* cited by examiner

LANDING GEAR UPLOCK MECHANISM EMPLOYING THERMAL PHASE-CHANGE ACTUATION

FIELD OF THE INVENTION

The present invention relates to landing gear control systems and in particular mechanisms for the retention and release of the landing gear when in the retracted position.

BACKGROUND OF THE INVENTION

Aircraft uplock mechanisms are designed to lock the landing gear in a retracted position and assist in carrying the weight of the gear during flight. Conventional uplock mechanisms consist of a spring-loaded catch that locks the gear in place and a hydraulic cylinder to release the locking mechanism to free the gear to be lowered for landing.

Current aircraft systems typically use a multitude of hydraulic subsystems as a source of mechanical energy. Typical state of the art uplocks employ one hydraulic actuator to perform the unlocking function, and often use a manually actuated cable system to perform the unlocking in the case of a hydraulic system failure. Other existing uplocks employ a secondary hydraulic actuator for the alternate release. Disadvantageously, hydraulic actuation system are complex and add unnecessary additional weight for the aircraft to carry.

There has been a trend in the aircraft industry toward electrical actuation systems. An overall reduction in aircraft weight can be observed through the use of electrical systems in preference to hydraulic systems. However, electrical actuation systems are complex to manufacture and not fully reliable.

To meet the challenge of releasing an uplock using electrical energy, two approaches have been investigated. In the first approach, an electromagnetic solenoid can be employed as the principal release actuator. Solenoids typically offer relatively low force per unit of mass, but they are simple and reliable. Solenoid systems can be employed where the weight of the landing gear can be lifted off the uplock hook prior to the solenoid being activated. In the case of a failure in which the landing gear lifting mechanism becomes inoperable, the weight of the gear on the hook would be too much for the solenoid to release. Systems employing solenoids for primary release also have a secondary release mechanism. This release mechanism can be of the manual, cable operated variety, but typically an electromechanical actuator is employed. An electromechanical actuator uses an electric motor coupled to a gearbox to provide a high force/torque actuation system. Electromechanical actuators have a high level of complexity and a number of vexing failure modes.

Accordingly, there is therefore a need for an aircraft landing gear actuation system which allows the release of the uplocks such as to obviate or mitigate at least some of the above presented disadvantages. Additionally, there is a need for an actuator which obviates or mitigates at lease some of the above presented disadvantages of actuators.

SUMMARY OF THE INVENTION

According to one aspect of the invention there is provided an uplock assembly comprising at least one of a primary and a secondary thermal actuation means for triggering the release of an uplock mechanism coupled thereto. Accordingly, the present invention utilizes at least one thermal actuator to trigger the uplock release mechanism.

According to one aspect, the thermal actuator comprises a chamber for containing expansible materials such as paraffin wax or other suitable materials. The thermal actuator further comprises a piston adapted to be extended for engaging the uplock release mechanism and causing it to release. Heating mechanisms are used within the thermal actuator to heat the wax and cause a volumetric expansion of the paraffin wax (e.g. during the solid to liquid phase change). According to one aspect, the heating mechanism includes for example, resistive heating elements which are used to melt expansible material contained within the cylindrical chamber in order to extend the piston and produce a linear actuation. According to another aspect of the invention, the thermal actuator comprises a peltier junction device for heating the expansible material in the chamber and causing linear actuation of the piston for subsequent release of the landing gear. According to a further aspect of the invention, the thermal actuator comprises a peltier junction device and a resistive heating device for cooperatively heating the expansible material.

According to another aspect, the present invention provides an uplock assembly having a thermal actuator for partly or entirely actuating an uplock release mechanism of the uplock assembly.

According to one aspect of the invention, the thermal actuator further comprises a first and a second dual redundant heating mechanisms for heating the expansible material such as paraffin wax. In one aspect, the first heating mechanism comprises a peltier junction thermoelectric heat pump to both transfer heat into the actuator to melt the wax and to transfer heat out of the actuator to cool the wax. According to another aspect, the second heating mechanism further comprises a resistive heating element for heating the expansible material.

According to one aspect, there is provided a thermal actuator comprising: a chamber configured to contain expansible material therein; a first thermostatic heating device coupled to said chamber and in communication with said material, said first thermostatic heating device operable to heat and to maintain said material at a predetermined temperature; a heating mechanism coupled to said chamber and in communication with said material, said heating mechanism operable to heat said material once at said predetermined temperature causing volumetric expansion thereof; and a piston slidably coupled to said chamber and adapted to extend in response to said volumetric expansion.

In one aspect, the predetermined temperature comprises a temperature below the melting temperature of the expansible material.

BRIEF DESCRIPTION OF THE DRAWINGS

Exemplary embodiments of the invention will now be described in conjunction with the following drawings, in which.

DETAILED DESCRIPTION OF THE PREFERRED EMBODIMENTS

Figure 1:
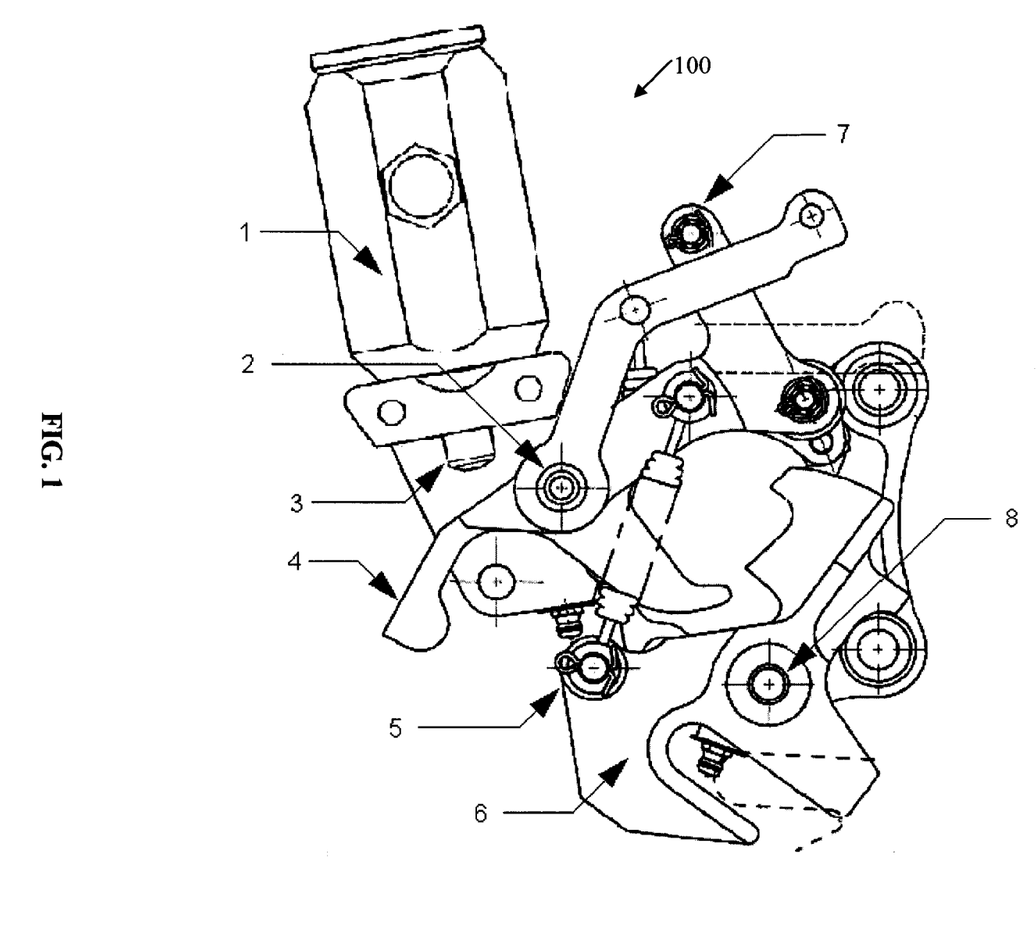
FIG. 1 is a side view of an uplock assembly including a thermal actuator in accordance with an embodiment of the invention.

According to an embodiment illustrated in FIG. 1, there is provided an uplock assembly 100 comprising a thermal actuator 1 for actuating an uplock release mechanism 4 and releasing a catch hook 6 to release landing gears and/or doors of an aircraft which are in the closed and retracted position. For example, this may occur to free the gear for landing of the aircraft. As will be understood by a person skilled in the art, thermal actuators may also be referred to as paraffin actuators or wax actuators.

As will be described, the thermal actuator 1 further comprises a substantially enclosed chamber (e.g. cylindrical) configured to contain expansible material 15 (e.g. paraffin wax, FIG. 3) that undergoes volumetric change due to a temperature change (such as paraffin wax, or other waxes or materials that are able to expand in volume during a solid to liquid phase change caused by heating of the material). Preferably, the cylindrical chamber is rigid. The thermal actuator 1 further comprises a heating mechanism coupled to the cylindrical chamber and in communication with the expansible material for heating said expansible material and causing volumetric expansion thereof (e.g. during a solid to liquid phase change of the material). Referring to FIG. 1, the thermal actuator 1 additionally comprises a piston 3 coupled to the chamber and adapted to engage said uplock release mechanism 4 to release said catch hook 6 in response to said heating of the material.

The operation of the uplock assembly 100 will now be discussed in reference to FIG. 1. The uplock assembly 100 is configured for use with aircraft landing gear and landing gear doors. The orientation of the landing gear uplock assembly 100 is illustrated in FIG. 1 as it would be mounted in the landing gear bay. In operation, in order to lock the landing gear (not shown) up during flight, the gear retracts into the spring-loaded catch hook 6, which pivots upwards (counter-clockwise) about a first pivot point 8. In order to release the landing gear, the heating mechanism of the thermal actuator 1 heats said expansible material. As will be understood, heating the expansible material causes volumetric expansion of the material. The volumetric expansion causes a force against the piston 3 of the thermal actuator 1 such that the piston 3 extends to pivot the uplock release mechanism 4 about a second pivot point 2. On the other hand, once the material within the chamber is cooled (e.g. by drawing heat out of the material via the heating mechanism), this causes the volume of the material within the chamber to decrease allowing retraction of the piston 3. Once the gear has been released, the tension from a resilient biasing means such as a spring 5 returns the catch hook 6 to the unlocked state (the catch member 6 then pivots clockwise about the first pivot point 8). According to one embodiment, the gear can also be unlocked if electric systems fail by pulling on a manual cable release 7 coupled to the uplock release mechanism 4.

Thermal Actuator 7

According to one embodiment, the heating mechanism of the thermal actuator 1 further comprises at least one of a first and a second dual redundant heating mechanisms for heating the expansible material such as paraffin wax. In one aspect, the first heating mechanism comprises a peltier junction thermoelectric heat pump to both transfer heat into the actuator 1 to melt the expansible material such as wax and to subsequently transfer heat out of the actuator 1 when it is desired to cool the wax more rapidly. According to another aspect, the second heating mechanism further comprises a resistive heating element for heating the expansible material.

As will be understood by a person of ordinary skill in the art, redundancy is the duplication of certain components of a system to provide backup functionality in case one of the components fails or is otherwise inactive thereby improving reliability of the system. Accordingly, as will be described, the first and second heating mechanisms are adapted to provide redundant heating of the expansible material.

Figure 3:
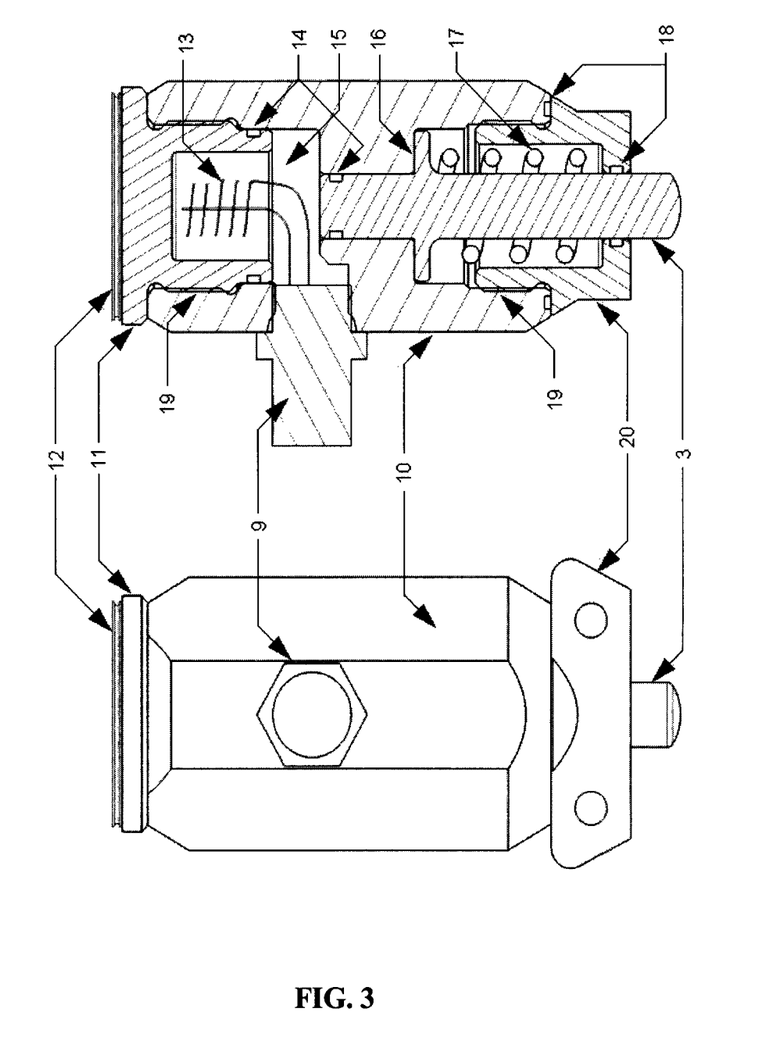
FIG. 3 is a side and cross section view of the thermal actuator according to one embodiment.

According to a preferred embodiment, there is provided dual redundant heating mechanisms. Referring to FIG. 3, shown is a side view and a cross-section of the thermal actuator 1 employing both heating mechanisms (peltier junction thermoelectric heat pump 12 and the resistive heating element 13). Thus, electric heating methods are used to melt the expansible material (e.g. paraffin wax 15) contained within the thermal actuator 1 causing it to expand and trigger the uplock release mechanism 4. Preferably, in order to improve reliability for aircraft applications, dual electric heating methods are employed to heat the paraffin 15. In one embodiment of the present invention, a nichrome resistive heating wire 13 is used in conjunction with a peltier junction thermoelectric heat pump 12. Each heating method can provide enough energy to release the uplock release mechanism 4 independently. That is, when one of the two heating mechanisms (e.g. one of the nichrome resistive heating wire 13 or the peltier junction thermoelectric heat pump 12) fails or is otherwise inactive, the other one of the two heating mechanisms is operable to heat the material 15 and provide sufficient volumetric expansion to cause the extension of the piston 3. Further, when both heating mechanisms are used in conjunction (e.g. the resistive heating 13 and the peltier junction thermoelectric heat pump 12), this allows faster heating of the material 15 and faster extension of the piston 3 thereby reducing the response time to actuate the uplock release mechanism 4.

In addition, the peltier junction thermoelectric heat pump 12 is operable to both transfer heat into the actuator 1 to melt the wax 15 and alternatively to transfer heat out of the actuator 1 to more rapidly cool it. As discussed earlier, the resistive heating element 13 can also be used for heating the material. When the thermal actuator 1 comprises both heating mechanisms as illustrated in FIG. 3, the peltier junction thermoelectric heat pump 12 is operable to heat the expansible material in conjuction with the resistive heating element 13. Thus, the dual redundant heating mechanisms allow for faster heating of the expansible material (e.g. the paraffin 15) to allow the actuation of the piston 3 and the engagement of the uplock release mechanism 4 to be more instantaneous. In addition, as described above, the peltier junction thermoelectric heat pump 12 is operable to transfer heat out of the actuator 1 to allow the expansible material to cool faster thereby causing the volume of the material to decrease. As discussed earlier, the volume contraction of the material removes the force placed on the piston 3 allowing the piston 3 to retract.

Accordingly, small volumes of paraffin wax 15 or other expansible materials when melted, can create high pressures within the chamber and therefore result in high actuation forces on the piston 3 causing the piston 3 to extend. In this way, either one or both heating mechanisms (peltier junction heat pump 12 and resistive heating element 13) may be used to heat the expansible material such as the paraffin 15. In addition, this dual redundant heating mechanism allows one of the heating mechanisms to carry out the task of heating the paraffin wax 15 in case of a failure by the other one of the heating mechanisms. Further, when both of the heating mechanisms (peltier junction heat pump 12 and resistive heating element 13) are used, this allows the expansible material 15 to heat and cool faster.

Figure 2:
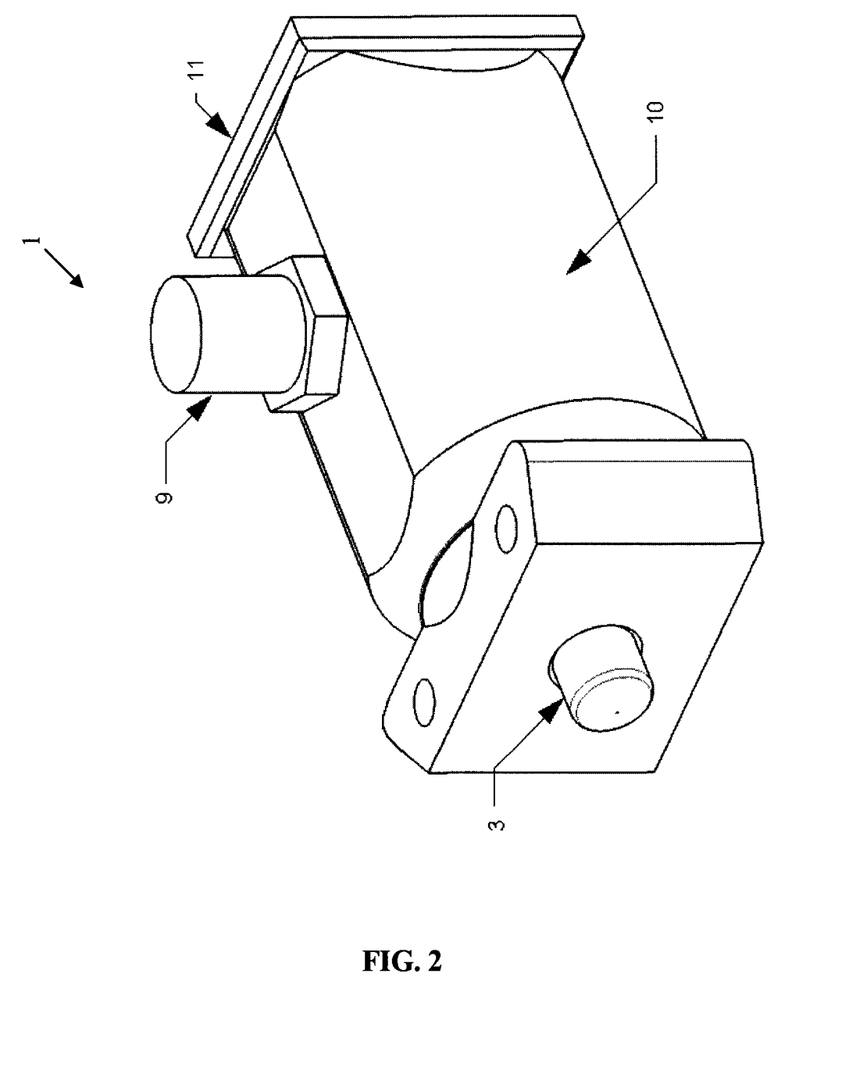
FIG. 2 is an isometric view of the uplock release thermal actuator from the uplock assembly in FIG. 1.

Referring to FIG. 2, the thermal actuator 1 comprises a connector 9, a thermally conductive end cap 11, a housing 10 for containing the chamber having the expansible material therein, and a piston 3.

The cross section view in FIG. 3 shows the expansible material 15 (e.g. paraffin) contained within a thermally insulating housing 10 and a thermally conductive end cap 11. In order to extend the piston 3 an electric current is applied to one or both of the aforementioned heating mechanisms (peltier junction heat pump 12 and resistive heating element 13). The peltier device 12 passes heat into, or away from, the paraffin 15 from outside the thermal actuator 1 through the thermally conductive end cap 11. One embodiment of the present invention supplies current to the nichrome resistive heating wire 13 through a hermetically sealed connector 9.

In designing a thermal actuator 1, consideration is given to ensure a substantially full retraction of the piston 3 after each cycle. According to one embodiment, in order to recycle a thermal actuator 1, a spring 17 is embedded in the actuator 1 to assist in returning the piston 3 as the wax 15 cools and solidifies.

As illustrated in FIG. 3, the thermal actuator 1 employs the use of the spring 17 to ensure a substantially complete retraction of the piston 3 during solidification of the expansible material 15. According to the present embodiment, the compression spring 17 resists the linear extension of the piston 3 so that during the cooling phase the piston 3 is returned to its fully retracted state. The additional piston geometry 16 functions as a hard stop to limit the pistons 3 travel between the housing 10 and the mount cap 20.

Referring again to FIG. 3, the thermal actuator 1 further comprises high-pressure seals 14 which contain the expanding paraffin 15 as it undergoes the phase change during heating. In addition, the thermal actuator 1 comprises environmental seals 18 which ensure contaminants do not interfere with the internal motion of the piston 3 or spring 17. Both the mount cap 20 and the end cap 11 are threaded 19 and therefore fastened to the housing 10 when they are screwed into place.

Peltier Junction Thermoelectric Heat Pump 12

The following discussion provides an overview of the operation of the peltier junction thermoelectric heat pump 12 used with the thermal actuator 1 such as that illustrated in FIG. 3. The peltier junction thermoelectric heat pump 12 is a semiconductor device that induces thermodynamic energy flow between its two opposing plates. The amount of heat transferred is proportional to the amount of current passed through an alternating series of n-type and p-type semiconductors given by:

$$Q = 2 \cdot N \cdot \{\alpha \cdot I \cdot T_c - [(I^2 \cdot \rho)/(2 \cdot G)] - \kappa \cdot \Delta T - G\}$$

Q: Heat Pumped (W)
N: Number of Thermocouples
$\alpha$: Seebeck Coefficient (V/K)
I: Current (A)
$T_c$: Cold Side Temperature (K)
$\rho$: Restivity ($\Omega \cdot$cm)
G: Area/Length of Thermoelectric Element (cm)
$\kappa$: Thermal Conductivity (W/cm·K)
$\Delta T$: Hot Side Temperature—Cold Side Temperature (K)

Peltier devices 12 can be used to efficiently heat an object such as the paraffin 15 by drawing energy from the environment as well as by delivering the heat from its internal resistive power losses. Reversing the electrical polarity of the peltier junction 12 cools the object by pumping heat in the other direction and releasing it into the atmosphere. Thus, according to one embodiment, when the landing gear has been released as a result of heating the expansible material 15, the thermal energy of the liquid paraffin 15 can be actively dissipated by reversing the electrical polarity of the peltier device 12. This combination of heating and cooling using the bi-directional heat transfer property of the peltier device 12 is advantageous because it decreases the overall actuator cycle time and allows faster heating and cooling of the paraffin 15.

The thermal energy transferred through the peltier device 12 during the cooling phase is dissipated through a heatsink (not illustrated in the figures). To reduce the volume of metal that must be heated during actuation, the heatsink is preferably kept small and the forced convection of a fan is used to dissipate the necessary thermal energy.

Housing 10

Materials surrounding and/or in contact with the paraffin 15 are selected such that they have low thermal conductivities. This design principal will result in reduced thermal losses through heat dissipation, increased efficiency and therefore reduced actuation cycle times. As an example, this can be accomplished by manufacturing the housing 10 of the actuator 1 (FIGS. 2, and 3) from a high strength polymer or through the use of insulated inserts inside a metallic housing. Consideration must be given to allow proper thermal conduction of heat to and from the peltier device 12 through the end cap 11.

As described earlier, according to one embodiment, a single chamber thermal actuator 1 is employed to perform the uplock release action. Dual heat transfer methods (e.g. nichrome resistive wire 13 and peltier junction heat pump 12) are employed to provide a level of redundancy.

According to an alternative embodiment, a second thermal actuator 1 (not illustrated) is provided on the same uplock assembly 100 to function as the secondary release system to the first thermal actuator 1 described herein. This second actuator 1 would operate on an independent electrical supply to function as a redundant actuation source. As will be understood, if either one of the first and the second thermal actuators 1 failed, the other one of the first and the second thermal actuators 1 would be used as backup to actuate the uplock release mechanism 4 and cause the release of the catchhook 6 and the landing gear. Either (or both) of the heating method(s) (e.g. nichrome resistive wire 13, peltier junction heat pump 12 or other heating mechanisms as would be understood by a person skilled in the art) can be implemented to melt the paraffin 15 in this secondary actuator and cause the release of the landing gear.

Advantageously, the thermal actuator 1 generates a relatively large force for a small unit mass. In general, thermal actuators exhibit smooth operating characteristics and can be used in closed loop feedback systems. A disadvantage of known thermal actuators is the cycle time. Because the heating system must warm, then melt the wax; the actuation process is not instantaneous. According to one embodiment, the actuation time can be reduced by minimizing the volume of wax 15 in the cylindrical chamber of the housing 10 thereby minimizing the thermal conduction through the actuator body and maximizing the energy input.

Temperature Sensor 602 and Control System 604

Figure 6:
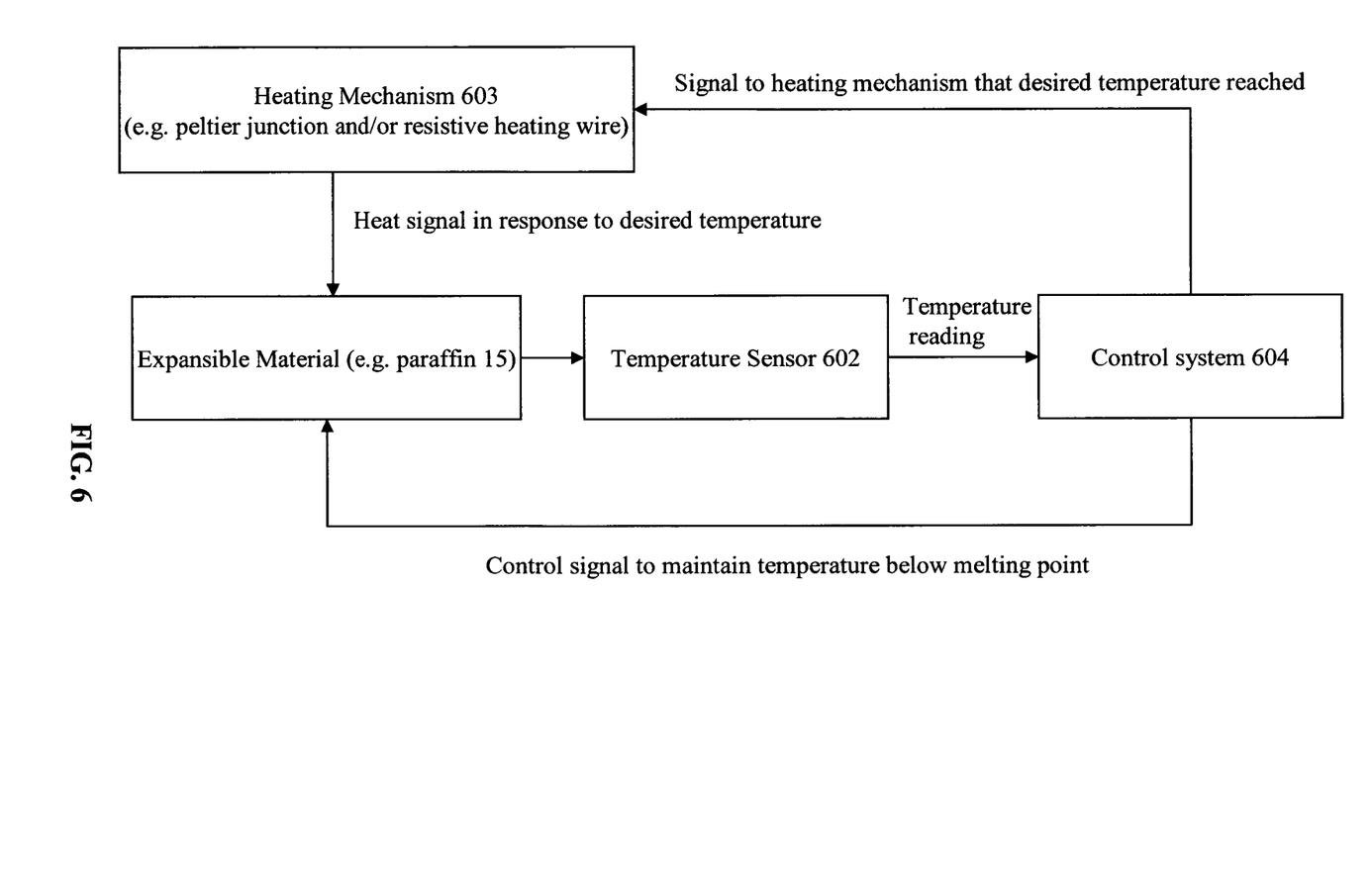
FIG. 6 is a schematic view illustrating the operation of the control system and temperature sensor of the thermal actuator according to one embodiment.

According to one embodiment, the thermal actuator 1 further comprises a temperature sensor 602 and a control system 604, as illustrated in FIG. 6. The temperature sensor 602 is operable to detect a temperature reading of the expansible material (e.g. paraffin 15) while the control system 604 is operable to receive the temperature reading and to continually control the temperature of the material according to the temperature reading.

For example, the temperature sensor 602 is embedded within the paraffin 15 of the thermal actuator 1. As illustrated in FIG. 6, the temperature data of the paraffin 15 can be fed back into a control system 604 which is operable to maintain the temperature of the paraffin 15 to just below the melting point. At this point, once the temperature of the paraffin 15 is just below the melting point 604, the heating devices 603 (e.g. the nichrome resistive wire 13 and/or the peltier junction heat pump 12 or other heating mechanisms) need only supply enough energy to overcome the latent heat of fusion and melt the paraffin 15 to cause volume expansion of the paraffin 15 and extension of the piston 3. Accordingly, this implementation reduces the thermal actuator 1 response time since the expansible material 15 is already at a predetermined temperature below the melting temperature and the nichrome resistive wire 13 and/or the peltier junction heat pump 12 would provide enough energy to melt the expansible material 15. Further, as will be understood by a person skilled in the art, the temperature sensor 602 and the control system 604 may be implemented similarly in the second thermal actuator (not shown).

According to one embodiment, the thermal actuator 1 further comprises a pressure sensor coupled to the expansible material and to the control system 604. The pressure sensor is adapted to monitor the pressure of the expansible material and provide a pressure reading thereof In one aspect, the control system 604 is operable to receive the pressure reading and to control the pressure of the expansible material to a predetermined amount. The control system is further operable to determine whether failure of the thermal actuator 1 has occurred due to an excessive pressure reading.

Figure 7:
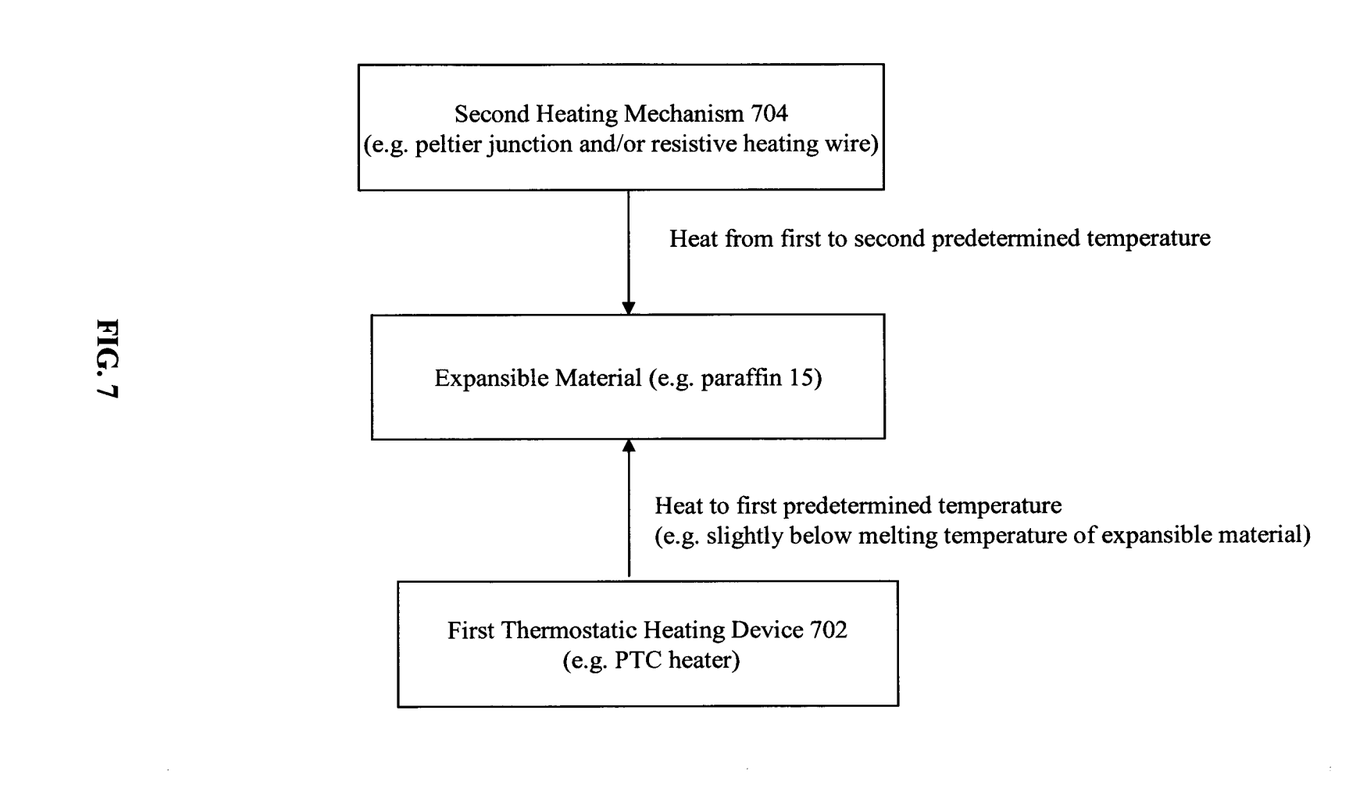
FIG. 7 is a schematic view illustrating the operation of thermostatic heating device and a heating mechanism of the thermal actuator according to another embodiment.

As described herein, it is advantageous to maintain the expansible material 15 at a predetermined temperature just below the melting point of the expansible material 15 such that only energy sufficient to overcome the latent heat of fusion is provided in order to cause the extension of the piston 3. In the embodiment described above, an active control system 604 is employed to maintain the temperature at a desired temperature with feedback from temperature sensors 602. According to another embodiment, the thermal actuator 1 provides improved cycle time by maintaining the temperature of the expansible material 15 at a first predetermined threshold, passively via a thermostatic heating device 702.

Thermostatic Heating Device 702

According to the present embodiment illustrated in FIG. 7, the thermal actuator 1 comprises a first thermostatic heating device 702 coupled to the chamber and in communication with the material 15, such that the first thermostatic heating device 702 is operable to heat said material 15 to a first predetermined temperature and to maintain said material 15 at the first predetermined temperature (e.g. slightly below melting temperature of the expansible material).

According to the present embodiment, the thermal actuator 1 further comprises a second heating mechanism 704 coupled to the chamber and in communication with the material 15 such that the second heating mechanism 704 is operable to heat the expansible material 15 from the first predetermined temperature to a second predetermined temperature. It will be understood by a person skilled in the art, that the first and second predetermined temperatures may include a range of desirable temperatures.

In one aspect, the first thermostatic heating device comprises a positive temperature coefficient (PTC) heater adapted to heat and maintain a desired threshold temperature of the expansible material 15. The second heating mechanism comprises a heating mechanism such as a resistive heating element or a peltier junction thermoelectric heat pump to transfer heat to the expansible material 15. As discussed, the second heating mechanism 704 is adapted to heat the expansible material from the first temperature reached via the thermostatic heating device 702 to the second predetermined temperature (e.g. melting temperature of the expansible material). That is, the second heating mechanism 704 is adapted to heat the expansible material up to a point to cause the melting of the material 15 and cause the volume increase thereof such as to provide sufficient energy to cause the piston 3 to extend.

As described earlier, according to a preferred embodiment, the thermal actuator 1 provides dual redundant heating mechanisms such that if one of the heating mechanisms fails or is otherwise inactive, the other heating mechanism is operable to heat the expansible material 15 sufficiently to cause the extension of the piston 3. Further, the dual redundant heating mechanism allows the two heating mechanisms to work together to cause faster heating of the expansible material 15 and reduce the cycle time further.

According to the present embodiment, the second heating mechanism 704 includes a dual redundant heating mechanism. In this case, the dual redundant heating mechanism is operable to heat said expansible material 15 in conjunction with the thermostatic heating device. That is, the thermostatic heating device 702 can maintain the temperature of the expansible material 15 to a predefined threshold (e.g. the first predetermined temperature below the melting point temperature of the material 15) prior to actuation. Each one of said dual redundant heating mechanisms can independently provide enough energy to melt the expansible material 15 upon actuation or both heating mechanisms can be used in parallel to allow faster heating of the expansible material 15 upon actuation.

In one aspect, the dual redundant heating mechanism comprises a first heating mechanism such as a peltier junction thermoelectric heat pump 12 and a second heating mechanism such as a resistive heating element 13. The dual redundant heating mechanism is operable to cooperate in heating the expansible material 15 with the thermostatic heating mechanism 702 comprises a positive temperature coefficient heater.

As will be understood by a person skilled in the art, other combinations of the dual redundant heating mechanisms may be envisaged. For example, the dual redundant heating mechanism may include two peltier junction thermoelectric heat pumps 12 in communication with the expansible material 15 and operable to cooperate with the thermostatic heating device to heat the expansible material 15 from the first predetermined temperature (e.g. just below the melting point temperature) to a second predetermined temperature which causes the volume expansion of the material 15 and results in extension of the piston 3.

Preferably, in one aspect, the thermal actuator 1 employs a positive temperature coefficient (PTC) heater in combination with a peltier junction thermoelectric heat pump 12, both devices are configured to heat the expansible material 15. In operation, the positive temperature coefficient heater is activated to transfer heat into the expansible material and to maintain the material at a first predetermined temperature. While the PTC heater is transferring heat into the expansible material, the peltier junction thermoelectric heat pump is deactivated until actuation of the piston 3 is desired. As the positive temperature coefficient heater is capable of thermostatic operation, it will self-regulate to a designed critical temperature (e.g. the first predetermined temperature) and reach steady state temperature. Said designed critical temperature can be selected at the forming of the positive temperature coefficient heater to be of a predefined temperature such that at said predefined temperature, the expansible material will be maintained at below its melting point. Once actuation of the piston 3 is desired, the peltier junction thermoelectric heat pump 12 is activated to provide energy to overcome the latent heat of fusion of the expansible material 15, thereby melting the material 15 (e.g. by reaching the second predetermined temperature) and operating the actuator 1. On retraction, the peltier junction thermoelectric heat pump 12 operation is reversed to remove energy from the material to solidify the material 15. Upon reaching a predefined temperature, the peltier junction thermoelectric heat pump 12 is deactivated and the positive temperature coefficient heater is operable to bring the material 15 to a steady state temperature at the designed critical temperature (e.g. the first predetermined temperature).

Alternatively, the embodiment described hereinabove can be configured with a nichrome resistive heater 13 rather than a peltier junction thermoelectric heat pump 12 such that the nichrome resistive heater 13 is configured to melt the material 15 once actuation of the piston 3 is desired.

Operation of the PTC Heater

An overview of the operation of a positive temperature coefficient heater is described herein. Preferably, said heater is formed from a ceramic material having a positive temperature coefficient, such that the highly non-linear thermal response results in a sudden rise in the material's resistivity past a certain critical temperature. Typical materials having this characteristic are barium titanate and lead titanate composites. By using this material, the heater is capable of acting as its own thermostat, and control the temperature of the heater passively. As current is applied to the heater, the resistivity is relatively low and therefore, the temperature rises due to resistive heating. However, as the temperature rises past the designed critical temperature, the resistivity rises significantly and reduces the current flow and in turn, resistive heating. What results is a steady state with the temperature of the heater at the critical temperature (e.g. the first predetermined temperature).

Figure 4:
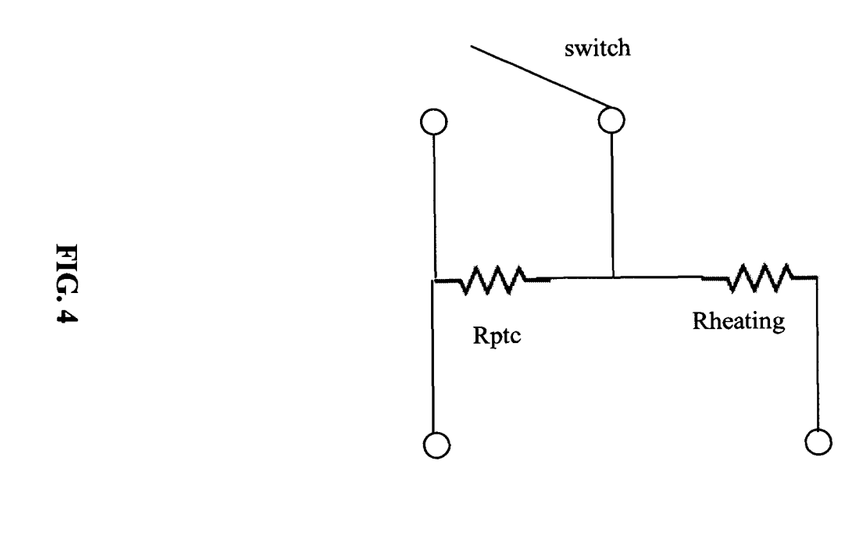
FIG. 4 is a schematic diagram of one implementation of the positive temperature coefficient heater for use with the thermal actuator.

In another embodiment illustrated in FIG. 4, a positive temperature coefficient resistor is placed in series with a resistive heating element such that the PTC resistor acts to regulate the current flow through the heating element and maintain a steady state temperature. Since the two resistors are in series, they share the same current flow. By virtue of the relation between resistivity and temperature in a PTC heater, the increase resistance will reduce the overall current flowing through the branch as the temperature rises. When additional heating is required the PTC resistor may be shunted to 0 ohms through the use of a switch mechanism, permitting the full flow of current through the heating element.

Dual-Redundancy

As described briefly hereinbefore, the use of a multitude of heating mechanisms to actuate the thermal actuator 1 provides redundancy. As per one embodiment illustrated in FIG. 3, shown is a side view and a cross-section of the thermal actuator 1 employing both heating mechanisms (peltier junction thermoelectric heat pump 12 and the resistive heating element 13). Further, as described earlier, according to one embodiment, the peltier junction thermoelectric heat pump 12 operates as the primary heating mechanism while the resistive heating element 13 operates as the secondary heating mechanism thereby providing redundant heating in case of failure or in order to heat the expansible material faster (when both the peltier junction thermoelectric heat pump 12 and the resistive heating element 13 operate in parallel).

In one operation, the primary heating mechanism is activated to heat the expansible material when it is desirable to release the uplock assembly, or as per an embodiment of the invention, is activated to maintain the expansible material at a predefined temperature point. Furthermore, both primary and secondary heating mechanism can be configured to heat the expansible material in conjunction, as described by an embodiment of the invention. The redundancy provided by the secondary heating mechanism allows said secondary heating mechanism to carry out the task of actuating the uplock mechanism in the case of a failure by the primary heating mechanism. Said failure modes of the primary heating mechanism may include but not limited to, electrical supply failure and unexpected temperature readings. In such cases, the control system 604 of the thermal actuator 1 is capable of monitoring the temperature of the expansible material such that for example, extended disparities between the actual temperature and desired temperature of the expansible material can signal heating mechanism failure. The operation of the primary and secondary heating mechanisms are described in hereinabove.

The thermal actuator 1 shown in FIG. 3 is configured to solely actuate the uplock release mechanism 4. According to an alternate embodiment, the thermal actuator 1 is operable to function in a hybrid configuration whereby the thermal actuator 1 acts as a first actuator and a second alternative actuator acts as a secondary actuator. Said second alternative actuator includes for example, an electric motor actuator, a hydraulic actuator, an electrical solenoid actuator and other such actuators, as described by the state of the art, or combinations thereof. Each of the first and second actuator can be configured to entirely actuate the uplock mechanism, thereby providing yet another level of redundancy. This dual redundancy allows one of the actuator to carry out the task of unlocking the uplock mechanism in case of a failure by the other one of the actuators. Alternatively, the first and second actuator can be configured to partially actuate the uplock mechanism. Furthermore, the first and second actuator is operable to actuate the release mechanism in conjunction.

Figure 5:
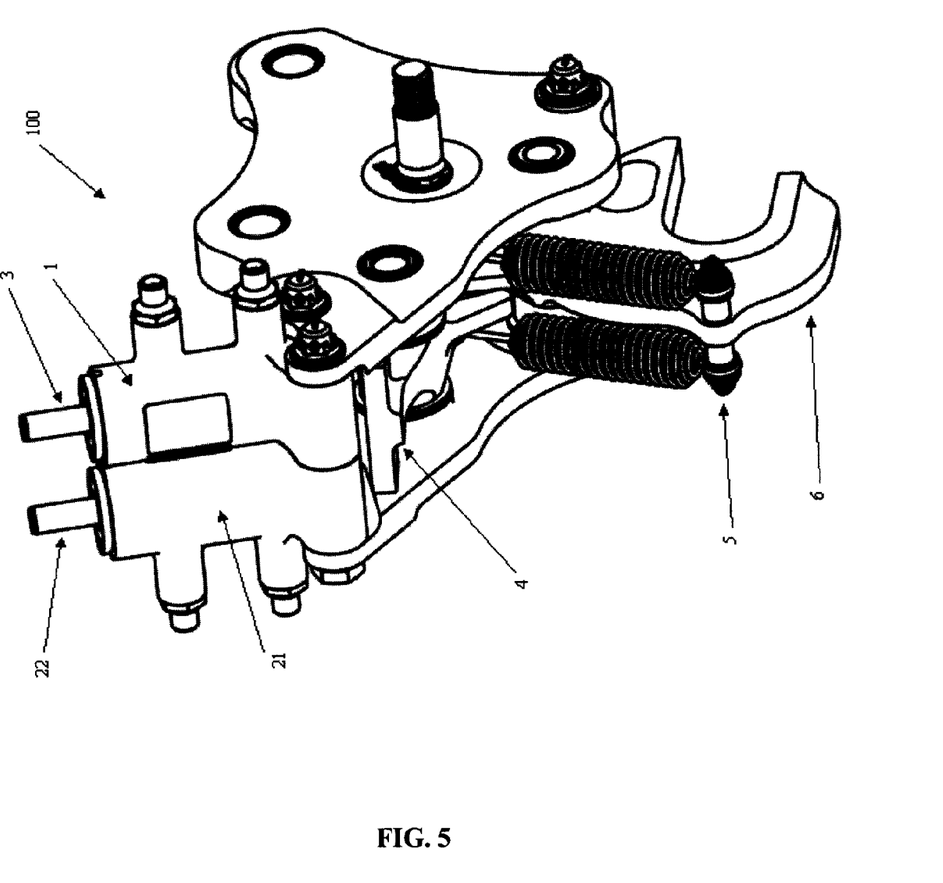
FIG. 5 is an isometric view of the uplock assembly according to an alternative embodiment.

Referring to FIG. 5, shown is an isometric view of the uplock assembly 100 employing two actuators. In this embodiment, the uplock assembly 100 comprises a first thermal actuator 1 and a second hydraulic actuator 21. In this configuration, both actuators (1 and 21) can actuate the uplock release mechanism 4. The thermal actuator piston 3 and hydraulic actuator piston 22 are capable of being in contact with uplock release mechanism to actuate the uplock mechanism 100 in a manner described in the single-actuator configuration.

As described hereinabove, the two actuators 1, 21 can be operated to provide dual-redundancy in actuating the uplock release mechanism. According to one aspect illustrated in FIG. 5, the thermal actuator 1 acts as the primary actuator and the hydraulic actuator 21 acts as the secondary actuator. In the case that thermal actuator 1 exhibits failure behaviour, the thermal actuator 1 is disabled (e.g. inactive) and the hydraulic actuator 21 assumes the primary actuator role (e.g. active). Such failure behaviour may include but not limited to heater failure (both primary and secondary heating mechanisms) or lack of actuation after a predefined time. In such cases, the processing system of the uplock assembly 100 is capable of monitoring the position of the uplock release mechanism 4 and determining the elapsed time between desired actuation and actual actuation. For example, an unacceptable elapsed time may demonstrate a failure in the uplock actuator and would therefore signal the secondary actuator to assume the role of the primary actuator (e.g. become active) and the primary actuator be disabled (e.g. inactive).

Although the thermal actuator 1 illustrated in FIG. 3 having dual redundant heating mechanisms (e.g. the nichrome resistive wire 13 and peltier junction heat pump 12) which can operate in parallel or individually has been described herein for use with an uplock assembly 100, it will be understood by a person skilled in the art that other uses and applications for the thermal actuator 1 may be envisaged.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

Although the preferred embodiments of the invention have been described herein, it will be understood by those skilled in the art that variations may be made thereto without departing from the spirit of the invention or the scope of the appended claims.

What is claimed is:

1. An uplock assembly for retaining and releasing landing gear systems, said uplock assembly comprising:
    a thermal actuator comprising:
        a chamber configured to contain expansible material therein;
        a heating mechanism coupled to said chamber for heating said expansible material and causing volumetric expansion thereof;
        a piston slidably coupled to said chamber and adapted to extend in response to said volumetric expansion; and
    an uplock release mechanism releasably engaged by said piston when extended such that said engaged uplock release mechanism causes the release of said landing gear.

2. An uplock assembly according to claim 1 wherein said heating mechanism further comprises a first resistive heating device operable to heat said expansible material and a second peltier junction device operable to alternately heat and cool said expansible material, said heating and cooling causing actuation of said piston.

3. An uplock assembly according to claim 1 wherein said expansible material comprises paraffin wax.

4. An uplock assembly according to claim 1 wherein said thermal actuator further comprises a temperature sensor located within said chamber and operable to measure said temperature of said expansible material.

5. An uplock assembly according to claim 4 further comprising a control system in communication with said temperature sensor, said control system operable to receive said measured temperature and to maintain said temperature at a predetermined range below a predefined threshold.

6. An uplock assembly according to claim 5 wherein said predefined threshold comprises a melting point temperature of said expansible material.

7. An uplock assembly according to claim 2 wherein said resistive heating device is operable to heat said material in conjunction with said peltier junction device.

8. An uplock assembly according to claim 2 wherein each one of said resistive heating device and peltier junction device is operable to independently heat said material causing extension of said piston so as to provide redundancy when another one of said resistive heating device and second peltier junction device is inactive.

9. An uplock assembly according to claim 1 further comprising a second actuator selected from the group consisting of: a second thermal actuator, an electrical motor actuator, a hydraulic actuator, and an electrical solenoid actuator, wherein said second actuator is active and operable to engage said uplock release mechanism when said thermal actuator is inactive.

10. An uplock assembly according to claim 1 further comprising a first thermostatic heating device coupled to said chamber and in communication with said material, said first thermostatic heating device operable to heat and to maintain said material at a predetermined temperature, wherein said heating mechanism is operable to heat said material once at said predetermined temperature to a second temperature causing volumetric expansion of said expansible material.

11. An uplock assembly according to claim 10 wherein the first thermostatic heating device comprises a positive temperature coefficient (PTC) heater.

12. An uplock assembly according to claim 10, wherein said heating mechanism comprises at least one of a first resistive heating device operable to heat said expansible material and a second peltier junction device operable to alternately heat and cool said expansible material, said heating and cooling causing actuation of said piston.

13. An uplock assembly according to claim 10, wherein said predetermined temperature comprises a temperature below the melting temperature of said expansible material.

14. A method of engaging an uplock mechanism by a thermal actuator to release a catch member retaining a landing gear, the method comprising:
    heating expansible material located within a chamber of said thermal actuator, said heated expansible material undergoing volumetric expansion during solid to liquid phase change and causing actuation of a piston of said thermal actuator coupled to said chamber; and
    in response to said actuation, engaging said uplock mechanism to cause the release of said catch member resiliently coupled thereto.

15. A method according to claim 14, wherein heating expansible material further comprises:
    heating and maintaining said expansible material at a first predetermined temperature below the melting point of said expansible material;
    receiving a request to release the landing gear;
    heating said expansible material to a second temperature above the melting point of said expansible material in response to receiving said request, said second temperature causing volumetric expansion of said expansible material to cause the release of the catch member.

16. A method according to claim 15, further comprising:
    (a) providing a first and a second heating mechanism, each said heating mechanism operable to heat said expansible material;
    (b) heating said expansible material by one of said first and second heating mechanism;
    (c) monitoring said one of said first and second heating mechanism mechanisms to determine failure thereof; and
    (d) heating said expansible material by another one of said first and second heating mechanism in response to said determination of failure.

17. A method according to claim 16, wherein said first heating mechanism comprises a resistive heating device operable to heat said expansible material, and said second heating mechanism comprises a peltier junction device operable to alternately heat and cool said expansible material causing actuation of said piston.

\* \* \* \* \*